(12) United States Patent
Shimizu et al.

(10) Patent No.: US 6,443,540 B2
(45) Date of Patent: Sep. 3, 2002

(54) VEHICULAR BRAKE CONTROL APPARATUS AND VEHICULAR BRAKE CONTROL METHOD

(75) Inventors: Satoshi Shimizu, Suntou-gun; Yoshiaki Tsuchiya, Nishikamo-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/764,155

(22) Filed: Jan. 19, 2001

(30) Foreign Application Priority Data

Feb. 14, 2000 (JP) ........................................ 2000-035157

(51) Int. Cl.$^7$ ................................................. B60T 8/74
(52) U.S. Cl. ..................... 303/177; 303/9.62; 303/116.2
(58) Field of Search .............................. 303/9.62, 177, 303/116.2

(56) References Cited

U.S. PATENT DOCUMENTS

| 5,470,136 A | * 11/1995 | Tozu et al. ................. 303/147 |
| 5,620,240 A | * 4/1997 | Tuck et al. ................. 303/156 |
| 5,632,535 A | * 5/1997 | Luckevich et al. .......... 303/186 |
| 5,646,849 A | * 7/1997 | Walenty et al. ........ 364/426.01 |
| 5,676,434 A | * 10/1997 | Ichikawa et al. ........... 303/150 |
| 5,676,435 A | * 10/1997 | Breitenbacker et al. ...... 303/186 |
| 5,826,954 A | * 10/1998 | Schmitt et al. ............. 303/186 |
| 5,839,799 A | * 11/1998 | Fukada ........................ 303/146 |
| 5,842,755 A | * 12/1998 | Sugimoto et al. ........... 303/186 |
| 5,860,710 A | 1/1999 | Takemasa |
| 5,882,092 A | * 3/1999 | Koibuchi ..................... 303/146 |
| 5,887,957 A | * 3/1999 | Buttner et al. .............. 303/186 |
| 5,938,299 A | * 8/1999 | Hara et al. .................. 303/186 |
| 5,975,650 A | * 11/1999 | Meier et al. ................ 303/9.62 |
| 6,062,660 A | 5/2000 | Matsuno et al. |
| 6,079,800 A | * 6/2000 | Lin et al. ..................... 303/146 |
| 6,241,326 B1 | * 6/2001 | Ferguson et al. ........... 303/177 |
| 6,280,003 B1 | * 8/2001 | Oshiro et al. .............. 303/9.62 |
| 6,322,169 B1 | 11/2001 | Fennel |

FOREIGN PATENT DOCUMENTS

JP          5-213169          8/1993

* cited by examiner

Primary Examiner—Jack Lavinder
Assistant Examiner—Benjamin A Pezzlo
(74) Attorney, Agent, or Firm—Oliff & Berridge, PLC

(57) ABSTRACT

A vehicular brake control apparatus performs braking force limiting control for limiting, if the vehicle is in a predetermined driving state, braking forces applied to rear wheels of the vehicle in comparison with the braking forces applied to the front wheels. If it is judged during the braking force limiting control that the amount of braking operation by the driver has increased, the apparatus increases the braking forces applied to the rear wheels.

14 Claims, 5 Drawing Sheets

VEHICULAR BRAKE CONTROL APPARATUS AND VEHICULAR BRAKE CONTROL METHOD

INCORPORATION BY REFERENCE

The disclosure of Japanese Patent Application No. 2000-035157 filed on Feb. 14, 2000 including the specification, drawings and abstract, is incorporated herein by reference in its entirety.

BACKGROUND OF THE INVENTION

1. Field of Invention

The invention relates to a vehicular brake control apparatus and a vehicular brake control method that limits braking forces applied to rear wheels of a vehicle in comparison with those applied to front wheels of the vehicle.

2. Description of Related Art

There is known a brake control apparatus that limits braking forces distributed to rear wheels to prevent the rear wheels from being locked during a braking operation at a high speed. According to Japanese Patent Application Laid-Open No. 5-213169, if the deceleration has become equal to or higher than a predetermined value at the time of braking, the fluid pressures for transmitting braking forces to rear wheels are maintained. This can prevent the rear wheels from being locked prior to the locking of front wheels, and effectively preclude the vehicle from slipping sideways at the time of braking.

However, according to the aforementioned apparatus, the braking forces applied to the rear wheels are limited once the predetermined deceleration is reached. Therefore, even if the driver has depressed a brake pedal in an attempt to increase braking forces, they do not increase. As a result, the driver feels a sense of incongruity during a braking operation.

SUMMARY OF THE INVENTION

It is an object of the invention to provide a vehicular brake control method that maintain braking performance and stability of the vehicle and do not cause a sense of incongruity to the driver during a braking operation.

A vehicular brake control apparatus according to a first aspect of the invention includes a brake controller that limits, if the vehicle is in a predetermined driving state, braking forces applied to rear wheels of the vehicle in comparison with braking forces applied to front wheels of the vehicle. The brake controller also determines a brake operating amount by a driver. The brake controller increases the braking forces applied to the rear wheels if the brake controllers determines during the braking force limiting that the brake operating amount has increased.

According to the first aspect of the invention, if the brake operating amount has increased, the braking forces applied to the rear wheels, as well as those applied to the front wheels, are increased, whereby the decelerating force acting on the vehicle is increased. This provides a vehicle behavior suited for the feeling of the driver.

The brake controller determines, if the deceleration of the vehicle is equal to or higher than a predetermined value, that the vehicle is in the predetermined driving state, and limits the braking forces applied to the rear wheels based on the deceleration, thereby preventing the locking of the wheels and stabilizing the behavior of the vehicle. As the braking force limiting is not performed if the deceleration is low, the braking performance is improved.

The brake controller may determine that the brake operating amount by the driver has increased, by determining that the deceleration of the vehicle has increased. If the driver has further depressed the brake pedal during the braking force limiting, the braking forces applied to the front wheels are not limited. Therefore, the braking forces applied to the front wheels increase in accordance with the operation of the pedal, so that the deceleration of the vehicle increases. Accordingly, the increased brake operating amount can also be determined from an increase in the deceleration of the vehicle.

DETAILED DESCRIPTION OF PREFERRED EMBODIMENTS

Figure 1:
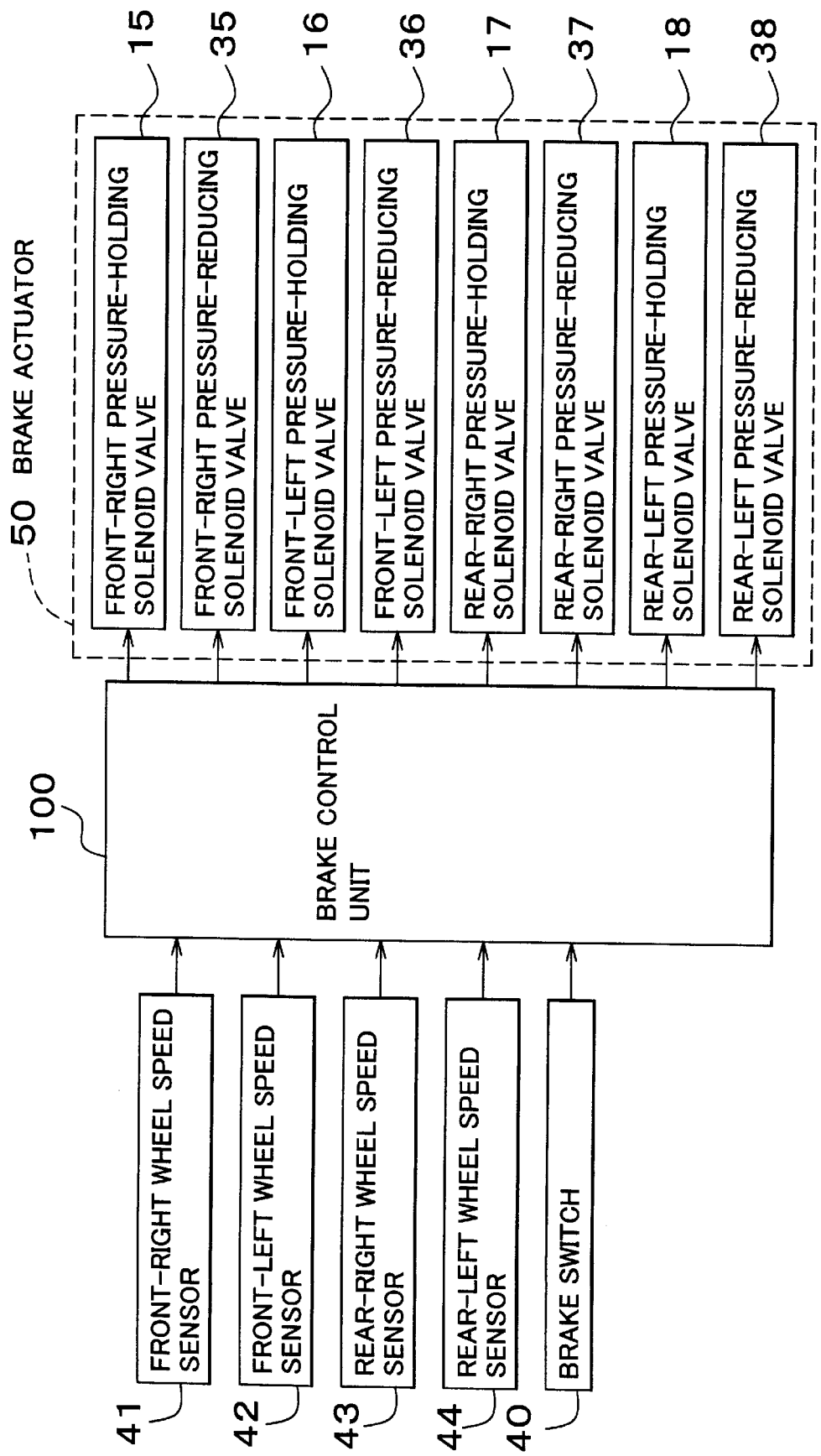
FIG. 1 shows the structure of a vehicular brake control apparatus according to the invention.
Figure 2:
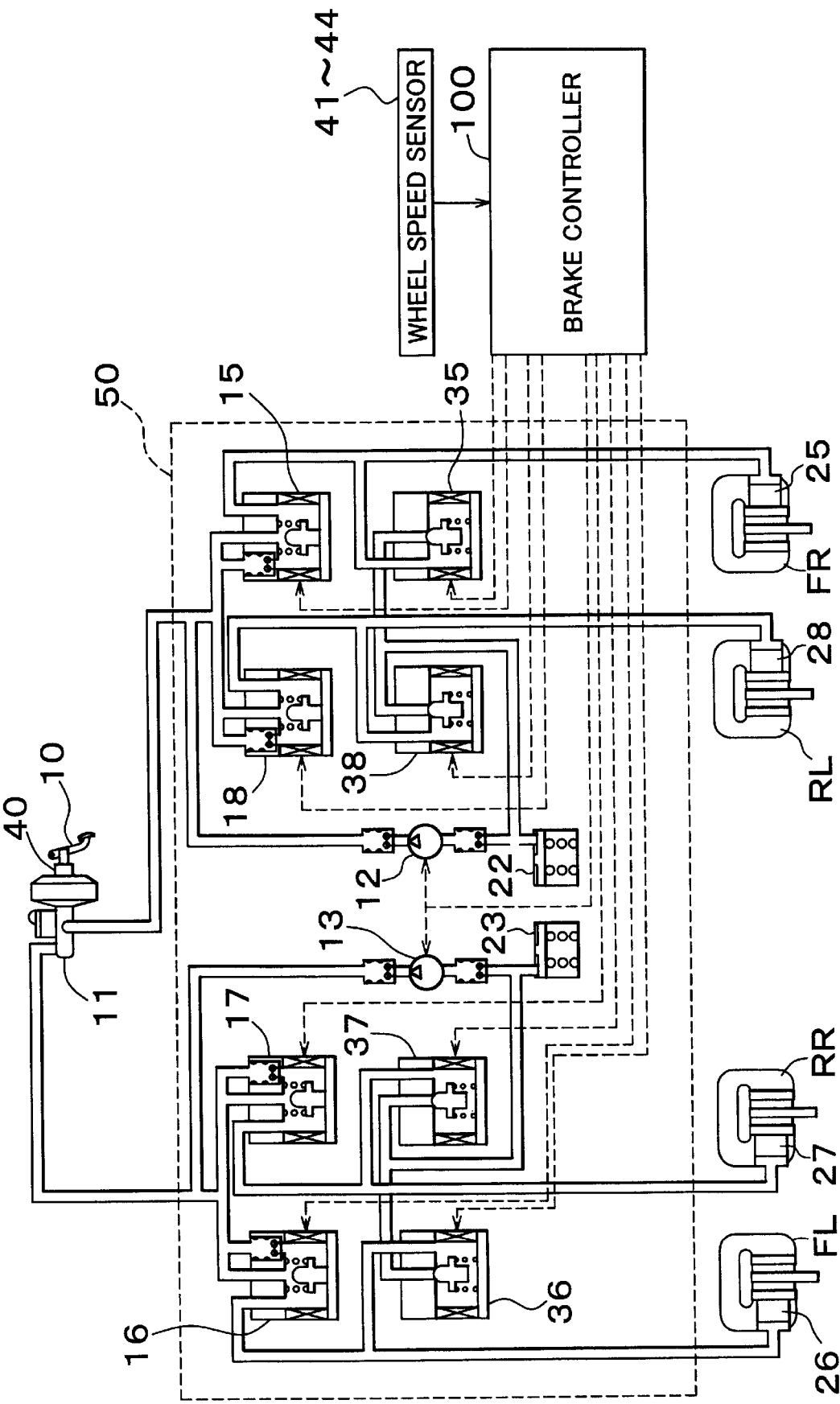
FIG. 2 shows the structure of a braking system of a vehicle equipped with the control apparatus shown in FIG. 1.

Hereinafter, various exemplary embodiments of the invention will be described with reference to the attached drawings. FIG. 1 shows the structure of a vehicular brake control apparatus according to the invention. FIG. 2 shows the structure of a braking system of a vehicle equipped with this control apparatus.

Referring to FIG. 2, the structure of the braking system of the vehicle will be described. The vehicle has wheel cylinders 25–28 for applying a braking force to a front-right wheel FR, a front-left wheel FL, a rear-right wheel RR and a rear-left wheel RL, respectively. The braking of the vehicle is carried out by the wheel cylinders 25–28.

A brake pedal 10 for operating the braking system is connected to a piston shaft of a master cylinder 11. A brake switch 40 for detecting an operating state of the brake pedal 10 is connected to the brake pedal 10.

Two fluid lines, including a fluid line for the front-right wheel FR and the rear-left wheel RL and a fluid line for the front-left wheel FL and the rear-right wheel RR, extend from the master cylinder 11. The working fluid lines are connected to the wheel cylinders 25–28 for the respective wheels through a brake actuator 50. The respective fluid lines branch in the brake actuator 50. Pressure-holding solenoid valves 15–18 and pressure-reducing solenoid valves 35–38 are disposed for the wheel cylinders 25–28 respectively. Pumps 12 and 13 and reservoirs 22 and 23 are disposed between the pressure-reducing solenoid valves 35, 38 and 36, 37 and branching portions, respectively.

As shown in FIG. 1, the output signals of wheel speed sensors 41–44 for detecting the speeds of the front wheels FR, FL and the rear wheels RR, RL and the output signal of the brake switch 40 are supplied to a brake controller 100. In addition, the brake controller 100 controls the solenoid valves 15–18 and 35–38 in the brake actuator 50.

Figure 3:
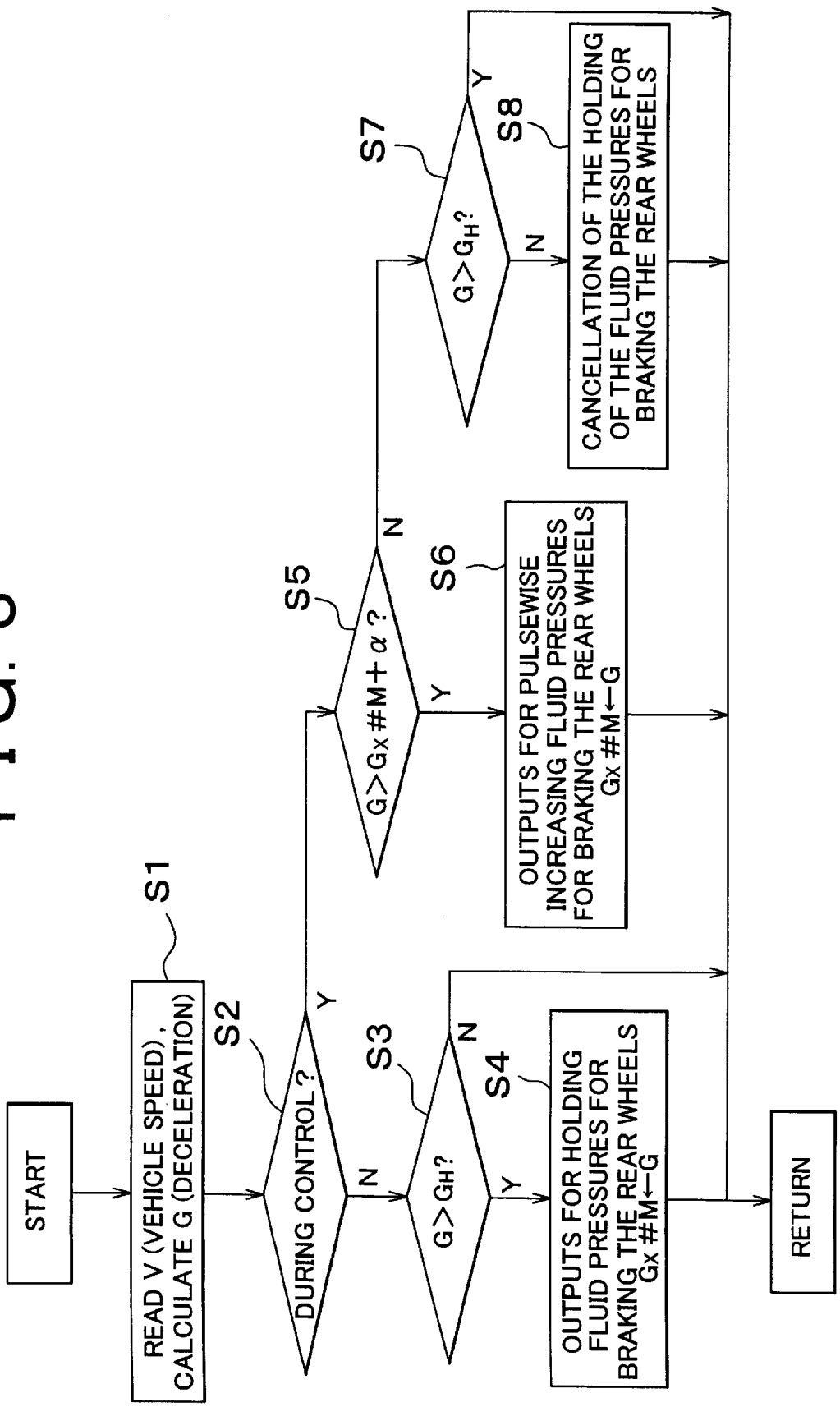
FIG. 3 is a flowchart showing distribution control performed by the apparatus shown in FIG. 1.
Figure 4:
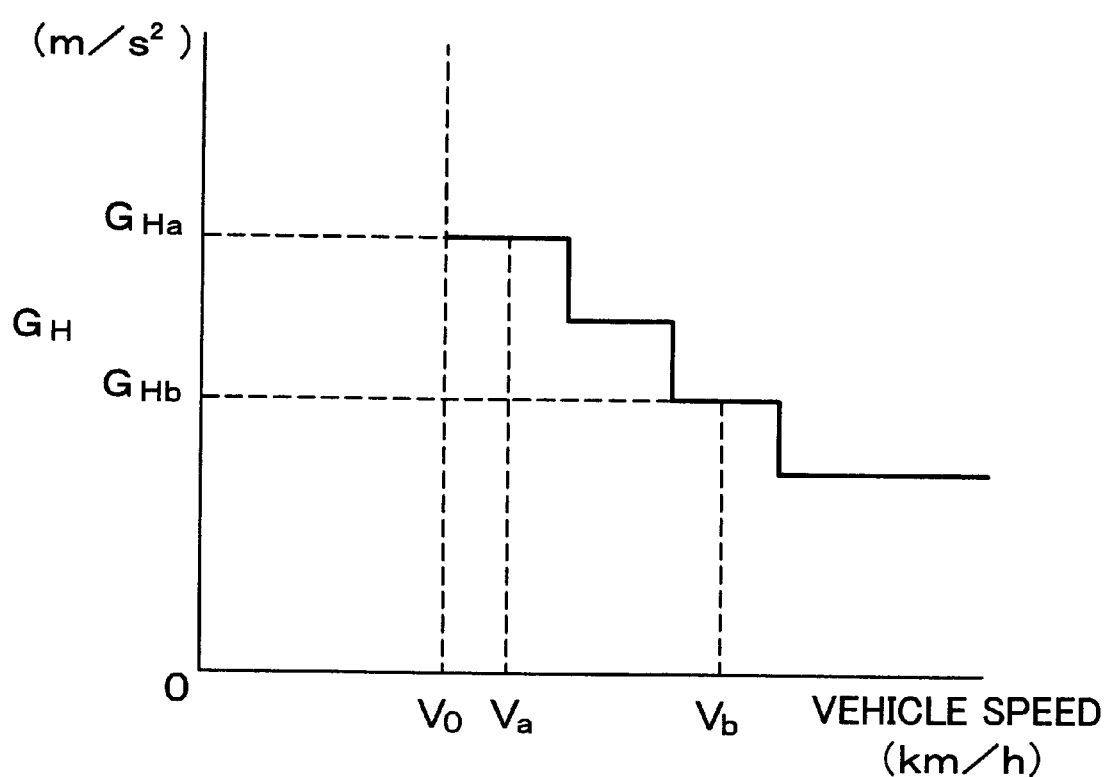
FIG. 4 is a graph showing a relation between deceleration thresholds and vehicle speeds.

Braking force distribution control for the front and rear wheels, which constitutes the feature of brake control of the vehicular brake control apparatus according to the invention, will now be described. FIG. 3 is a flowchart showing the distribution control. FIG. 4 is a graph showing a relation between deceleration thresholds used for the distribution control and vehicle speeds.

Initially, if the brake pedal 10 has been depressed, the piston shaft of the master cylinder 11 is pressed so that a fluid pressure (master pressure) corresponding to the brake operating amount is generated. In the early stage of the braking operation, the pressure-holding solenoid valves 15–18 for the respective wheels are open, whereas the pressure-reducing solenoid valves 35–38 are shut off. As a result, the master pressure is introduced into the wheel cylinders 25–28 for the respective wheels, whereby the brake is operated and braking forces are applied to the respective wheels.

Referring to FIG. 3 in an exemplary braking force distribution control according to the invention, in step S1, the brake controller 100 monitors the vehicle speed V based on output signals of the respective wheel speed sensors 41–44, and calculates the deceleration G from a change in the vehicle speed V. In step S2, it is judged whether or not a control for limiting the fluid pressures Pr is being performed.

If the braking force limiting is not being performed, the operation proceeds to step S3 where it is judged whether or not the current deceleration G has exceeded the deceleration threshold $G_H$ that is set according to the vehicle speed V as shown in FIG. 4. If the deceleration G is equal to or lower than the deceleration threshold $G_H$ (S3: No), the control is terminated without performing the braking force limiting. On the other hand, if the deceleration G has exceeded the deceleration threshold $G_H$ (S3: Yes), the operation proceeds to step S4. In step S4, the pressure-holding solenoid valves 17, 18 connected to the wheel cylinders 27, 28 of the rear wheels RR, RL, respectively, are shut off, and the fluid pressures Pr supplied to the wheel cylinders 27, 28 are held as they are and thus prevented from increasing afterwards. Consequently, the braking forces applied to the rear wheels RR, RL are limited, the unnecessary locking of the rear wheels RR, RL is avoided, and the behavior of the vehicle is stabilized.

As shown in FIG. 4, the deceleration threshold $G_H$ for performing the braking force limiting is set smaller as the vehicle speed V increases. Thereby the vehicle is prevented from swaying due to the locking of the rear wheels as is often the case with a high-speed driving state, and the braking performance in the low-speed range can be guaranteed. Although the deceleration threshold $G_H$ is suitably set in accordance with the type of the vehicle, it may also be used by switching a plurality of functions in accordance with the shifting state or the like. Alternatively, the deceleration threshold $G_H$ may be set as a function of the vehicle speed V or stored in a memory in the brake controller 100 as a table in relation to the vehicle speed V.

Furthermore, in step S4, the deceleration at the start of the braking force limiting is incorporated into a variable Gx#M and stored in the memory in the brake controller 100.

If the braking force limiting is being performed (S2: Yes), the operation proceeds from step S2 to step S5. In step S5, it is judged whether or not the current deceleration G has exceeded the value incorporated into the variable Gx#M by a predetermined value α. If Yes in step S5, the operation proceeds to step S6 where the pressure-holding solenoid valves 15, 18 connected to the wheel cylinders 27, 28 of the rear wheels RR, RL, respectively, are opened temporarily. Thereby the fluid pressures Pr supplied to the wheel cylinders 27, 28 are slightly increased pulsewise.

During this control, the fluid pressures Pf supplied to the wheel cylinders 25, 26 for the front wheels FR, FL are not subjected to the braking force limiting. Therefore, if the brake pedal 10 has been depressed, the fluid pressures Pf increase accordingly, and the braking forces applied to the front wheels FR, FL increase so that the deceleration becomes high. In this control, if the deceleration has increased by the predetermined value α or more during the braking force limiting of the rear wheels, the braking forces applied to the rear wheels are increased slightly. Thus, if the driver has depressed the brake pedal 10 during the braking force limiting, the braking forces applied to the rear wheels can be increased accordingly. As a result, the driver does not feel a sense of incongruity when operating the brake. By suitably setting the increased amounts of the braking forces applied to the rear wheels and the decelerations for increasing the braking forces, the stability of vehicle behavior is maintained during the braking operation, especially when the vehicle travels at a high speed.

Furthermore, in step S6, the deceleration at the time of changes in the braking forces for the rear wheels is substituted for the value incorporated into the variable Gx#M and stored in the memory in the brake controller 100.

If the current deceleration G is equal to or lower than the sum of the predetermined value α and the value incorporated into the variable Gx#M (S5:No), the operation proceeds to step S7 where it is judged whether or not the current deceleration G has exceeded the deceleration threshold $G_H$. If Yes in step S7, the operation is terminated without performing other processings, in order to continue the braking force limiting. If the current deceleration G is equal to or lower than the deceleration threshold $G_H$ (S7: No), the fluid pressures Pr are thereafter set in the same manner as the fluid pressures Pf by canceling the braking force limiting, that is, by opening the pressure-holding solenoid valves 17, 18. Thus, the braking forces applied to the rear wheels RR, RL are set in the same manner as those applied to the front wheels FR, FL.

Figure 5:
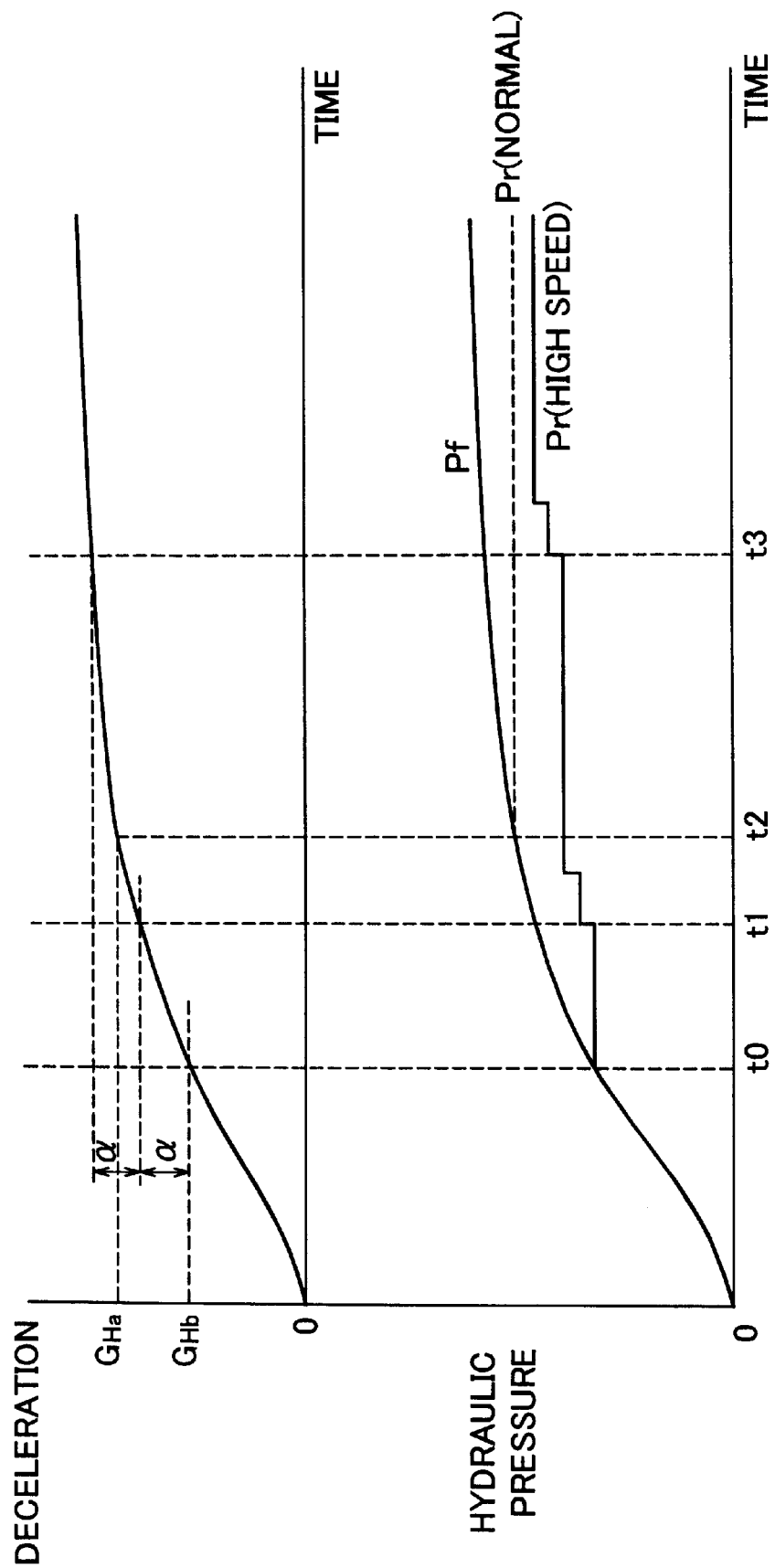
FIG. 5 is a graph showing time-series changes in the deceleration and brake fluid pressure during brake control performed by the vehicular brake control apparatus according to the invention.

FIG. 5 is a graph showing time-series changes in the deceleration G and brake fluid pressure during brake control performed by the vehicular brake control apparatus according to the invention.

It is assumed that the driver has started a decelerating operation by depressing the brake pedal 10 at a time 0 shown in FIG. 5. In accordance with the depressed amount of the brake pedal 10, the fluid pressures Pf supplied to the wheel cylinders 25, 26 for the front wheels FR, FL and the fluid pressures Pr supplied to the wheel cylinders 27, 28 for the rear wheels RR, RL increase, respectively, as shown in FIG. 5. Thereby the deceleration G increases, and the vehicle is decelerated.

If the vehicle speed is a relatively low speed Va, the deceleration threshold is set to a relatively large value of $G_{Ha}$ as shown in FIG. 4. Therefore, the fluid pressures Pr are held as shown in FIG. 5, and the braking force limiting to the rear wheels RR, RL is performed at a time $t_2$, which is after the start of the braking operation.

If the vehicle speed is a relatively high speed Vb, the deceleration threshold is set to a relatively small value of $G_{Hb}$ as shown in FIG. 4. Therefore, the braking force limiting is started at the time $t_o$, which is before the time $t_2$. Because the deceleration thereafter becomes higher than the deceleration threshold $G_{Hb}$ at the time of the start of the control by the predetermined value a at a time $t_1$, the fluid pressures Pr are then increased pulsewise. Furthermore, because the deceleration becomes higher than the deceleration threshold $G_{Hb}$ at a time $t_3$, by $2\alpha$, the fluid pressures Pr are again increased pulsewise.

For convenience of explanation, the fluid pressures Pr applied to the side of the rear wheels are changed along the passage of time pulsewise, that is, stepwise. However, it should be appreciated that the fluid pressures Pr may be changed smoothly by means of the brake controller 100 to prevent the driver and any passengers from feeling a sense of incongruity.

In the foregoing description, the brake operating amount by the driver is determined based on changes in the deceleration. However, it should be appreciated that the increase in the brake operating amount may be determined by detecting an increase in the brake stroke or master pressure. It should also be appreciated that the brake control for the rear wheels may be performed by detecting an increase in the slip amounts of the rear wheels based on the output values of the respective wheel speed sensors.

It will be appreciated by those skilled in the art that the brake controller 100 can be implemented using a single special purpose integrated circuit (e.g., ASIC) having a main or central processor section for overall, system-level control, and separate sections dedicated to performing various different specific computations, functions and other processes under control of the PLC. The brake controller 100 also can be a plurality of separate dedicated or programmable integrated or other electronic circuits or devices (e.g., hardwired electronic or logic circuits such as discrete element circuits, or programmable logic devices such as PLDs, PLAs, PALs or the like). The brake controller 100 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIG. 3 and described herein can be used as the brake controller 100. A distributed processing architecture can be used for maximum data/signal processing capability and speed.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A vehicular brake control apparatus, comprising:
    a brake controller that:
        determines a brake operating amount by a driver;
        limits braking forces applied to rear wheels of the vehicle in comparison with braking forces applied to front wheels when the vehicle is in a predetermined driving state;
        incorporates a value of a parameter, that changes according to the brake operating amount, into a threshold value for determining whether the braking forces applied to the rear wheels is increased during the braking force limiting; and
        increases the braking forces applied to the rear wheels, if the value of the parameter is larger than the incorporated threshold value during the braking force limiting.

2. The apparatus according to claim 1, wherein
    the brake controller determines that the vehicle is in the predetermined driving state when the deceleration of the vehicle is equal to or higher than a threshold value, and performs the braking force limiting.

3. The apparatus according to claim 1, wherein
    the parameter is the deceleration of the vehicle, and
    the brake controller determines that the brake operating amount by the driver has increased by determining that the deceleration of the vehicle has increased.

4. The apparatus according to claim 1, wherein
    the parameter is a stroke of a brake pedal, and
    the brake controller determines that the brake operating amount by the driver has increased by detecting an increase in the stroke of the brake pedal.

5. The apparatus according to claim 1, wherein
    the parameter is pressure in a master cylinder, and
    the brake controller determines that the brake operating amount by the driver has increased by detecting an increase in the pressure in the master cylinder.

6. The apparatus according to claim 1, wherein
    the parameter is a deceleration of the vehicle, and
    the brake controller determines that the brake operating amount by the driver has increased during braking force limiting by determining that a deceleration at the start of the braking force limiting has increased by more than a predetermined value.

7. The apparatus according to claim 6, wherein
    the brake controller determines if the deceleration is equal to or lower than a threshold value when the deceleration at the start of the braking force limiting has not increased by more than the predetermined value; and
    cancels the braking force limiting when the deceleration is equal to or lower than the threshold value.

8. A vehicular brake control method, comprising:
    determining a brake operating amount by a driver;
    limiting braking forces applied to rear wheels of the vehicle in comparison with braking forces applied to front wheels when the vehicle is in a predetermined driving state;
    incorporating a value of a parameter, that changes according to the brake operating amount, into a threshold value for determining whether the braking forces applied to the rear wheels is increased during the braking force limiting; and
    increasing the braking forces applied to the rear wheels, if the value of the parameter is larger than the incorporated threshold value during the braking force limiting.

9. The method according to claim 8, further comprising:
    determining that the vehicle is in the predetermined driving state when the deceleration of the vehicle is equal to or higher than a threshold value, and performing the braking force limiting.

10. The method according to claim 8, wherein the parameter is the deceleration, and the method further comprises
    determining that the brake operating amount by the driver has increased by determining that the deceleration of the vehicle has increased.

11. The method according to claim 8, wherein the parameter is a stroke of a brake pedal, and the method further comprises
    determining that the brake operating amount by the driver has increased by detecting an increase in the stroke of the brake pedal.

12. The method according to claim 8, wherein the parameter is pressure in a master cylinder, and the method further comprises
    determining that the brake operating amount by the driver has increased by detecting an increase in pressure in a master cylinder.

13. The method according to claim 8, wherein the parameter is a deceleration, and the method further comprises
   determining that the brake operating amount by the driver has increased during braking force limiting by determining that the deceleration at the start of the braking force limiting has increased by more than a predetermined value.

14. The method according to claim 13, further comprising:
   determining if the deceleration is equal to or lower than a threshold value when the deceleration at the start of the braking force limiting has not increased by more than the predetermined value; and canceling the braking force limiting when the deceleration is equal to or lower than the threshold value.

* * * * *